United States Patent [19]

Shimazu et al.

[11] Patent Number: 5,841,606
[45] Date of Patent: Nov. 24, 1998

[54] MAGNETIC RECORDING/REPRODUCING DEVICE WITH MAGNETIC SHIELD BETWEEN VOICE COIL MOTOR AND FLEXIBLE CABLE

[75] Inventors: Teruo Shimazu, Atsugi; Toshiharu Shimizu, Machida; Yoshihide Majima, Hatano; Toshimitsu Itoh, Atsugi, all of Japan

[73] Assignee: Mitsumi Electric Co., Ltd., Tokyo, Japan

[21] Appl. No.: 859,677

[22] Filed: May 20, 1997

[30] Foreign Application Priority Data

May 21, 1996 [JP] Japan ................................ 8-125684

[51] Int. Cl.$^6$ ........................... G11B 5/016; G11B 5/012
[52] U.S. Cl. ................................. 360/99.01; 360/97.01
[58] Field of Search ............... 360/97.01–97.04, 360/99.01

[56] References Cited

U.S. PATENT DOCUMENTS 4,672,250  6/1987  Seitz ............................................ 310/90
4,923,406  5/1990  Bucknam ..................................... 439/77

Primary Examiner—Allen T. Cao
Attorney, Agent, or Firm—Frishauf, Holtz, Goodman, Langer & Chick

[57] ABSTRACT

In a magnetic recording/reproducing device, a voice coil motor includes a voice coil and a magnetic circuit for producing a magnetic field intersecting the electric current flowing through the voice coil. The voice coil motor drives a carriage holding a magnetic head. A flexible printed circuit is disposed adjacent to the voice coil for feeding the electric current to the voice coil and sending signals to and from the magnetic head. Between the voice coil and the flexible printed circuit is interposed a magnetic shield for preventing to noise from influencing the flexible printed circuit upon feeding the electric current to the voice coil.

4 Claims, 4 Drawing Sheets

MAGNETIC RECORDING/REPRODUCING DEVICE WITH MAGNETIC SHIELD BETWEEN VOICE COIL MOTOR AND FLEXIBLE CABLE

BACKGROUND OF THE INVENTION

The present invention relates to a magnetic recording/reproducing device and, in particular, to a drive unit for driving a carriage in a given radial direction with respect to a magnetic recording medium in the magnetic recording/reproducing device.

As is well known, a flexible disk drive is a device for driving a flexible disk loaded therein. In recent years, the flexible disk has been improved to have a greater capacity. For example, a large-capacity flexible disk having a storage capacity of 150 Mbytes has been developed while a normal-capacity flexible disk has a storage capacity of 1 Mbyte to 2 Mbytes. Following this, a flexible disk drive has also been developed which is capable of driving such a large-capacity flexible disk.

Hereinafter, a flexible disk drive capable of driving only the large-capacity flexible disk will be referred to as a high-density dedicated flexible disk drive, while a flexible disk drive capable of driving only the normal-capacity flexible disk will be referred to as a normal-density dedicated flexible disk drive. On the other hand, a flexible disk drive capable of driving both the large-capacity and normal-capacity flexible disks will be referred to as a high-density/normal-density flexible disk drive. Further, if there is no need to distinguish between the high-density dedicated flexible disk drive and the high-density/normal-density flexible disk drive, both will be collectively referred to as a high-density flexible disk drive.

One of the main differences between the normal-density dedicated flexible disk drive and the high-density flexible disk drive resides in the structure of their drive units for moving a carriage holding a magnetic head in a predetermined radial direction with respect to a flexible disk loaded in the disk drive. Specifically, the normal-density dedicated flexible disk drive employs a stepping motor as the drive unit, while the high-density flexible disk drive employs a linear motor, such as a voice coil motor (VCM), as the drive unit.

Hereinbelow, the voice coil motor employed in the high-density flexible disk drive as the drive unit will be briefly explained. The voice coil motor includes a voice coil disposed rearward of the carriage and wound around a drive shaft extending in parallel to the foregoing predetermined radial direction, and a magnetic circuit for producing a magnetic field intersecting the electric current flowing through the voice coil. With this arrangement, when the electric current is caused to flow through the voice coil in a direction intersecting the magnetic field produced by the magnetic circuit, a drive force is generated in an extending direction of the drive shaft based on interaction between the electric current and the magnetic field. This drive force causes the carriage to move in the foregoing predetermined radial direction.

On the other hand, in the conventional voice coil motor, it is structurally unavoidable that a flexible printed cable or circuit is disposed adjacent to the voice coil for feeding the electric current to the voice coil therethrough. The flexible printed circuit further sends a write signal from the exterior to the magnetic head and a read-out signal from the magnetic head to the exterior. Specifically, the flexible printed circuit also includes signal lines for data writing and data reading relative to the flexible disk.

However, as described above, since the flexible printed circuit is arranged adjacent to the voice coil, the data signals (write and read-out signals) flowing through the flexible printed circuit may be subjected to noise due to the electric current flowing through the voice coil. This may cause errors in the data signals. Accordingly, if the conventional voice coil motor is employed in the magnetic recording/reproducing device, accurate data writing and reading can not be ensured.

SUMMARY OF THE INVENTION

Therefore, it is an object of the present invention to provide an improved magnetic recording/reproducing device which is free of error in performing write and read-out data operations caused by a magnetic field from a drive unit.

According to one aspect of the present invention, a magnetic recording/reproducing device comprises a main frame; a disk table rotatably mounted on the main frame for receiving and driving a recording medium thereon; a magnetic head for recording and/or reproducing data for the recording medium; a carriage disposed with a space from the main frame and supporting the magnetic head; a drive unit for driving the carriage in a predetermined radial direction with respect to the magnetic recording medium on the disk table; a flexible printed cable disposed adjacent the drive unit and extending outside of the device, the flexible printed cable comprising first conductive patterns connected to the drive unit for feeding a drive current to the drive unit and second conductive patterns connected to the magnetic head for transmitting a write signal to the magnetic head and a read-out signal from the magnetic head; and a magnetic shield element disposed in a gap between the drive unit and the flexible printed cable.

It may be arranged that the drive unit comprises a coil wound around a drive shaft extending in parallel to the predetermined radial direction and supplied with the drive current, and a magnetic circuit for generating the magnetic field intersecting the drive current flowing through the coil, the flexible printed cable being provided adjacent the coil, and the magnetic shield being disposed in a gap between the coil and the flexible printed cable.

It may be arranged that the magnetic shield is made of a material selected from the group consisting of copper, iron, aluminum and permalloy.

BRIEF DESCRIPTION OF THE DRAWINGS

The present invention will be understood more fully from the detailed description given hereinbelow, taken in conjunction with the accompanying drawings.

In the drawings:

FIGS. 2A–2C are diagrams showing a voice coil motor shown in FIG. 1, wherein FIG. 2A is a rear view, FIG. 2B is a plan view and FIG. 2C is a sectional view taken along line IIC—IIC in FIG. 2A.

DESCRIPTION OF THE PREFERRED EMBODIMENT

Now, a preferred embodiment of the present invention will be described in detail hereinbelow with reference to the accompanying drawings.

Referring to FIGS. 1A, 1B and 2A–2C, a magnetic recording/reproducing device comprises a flexible disk drive (FDD) for carrying out data recording and reproducing relative to a flexible disk (not shown). The flexible disk is inserted into the flexible disk drive in a direction A in FIG. 1A. The inserted flexible disk is held on a disk table assembly 12 with their center axes coinciding with each other. The disk table assembly 12 is rotatably supported on the surface of a main frame 11 of the flexible disk drive. The disk table assembly 12 is rotated by a drive motor (not shown) provided on the underside of the main frame 11 so as to rotate the flexible disk. Further, a board (not shown) mounted with a number of electronic components is attached to the underside of the main frame 11.

Figure 1A:
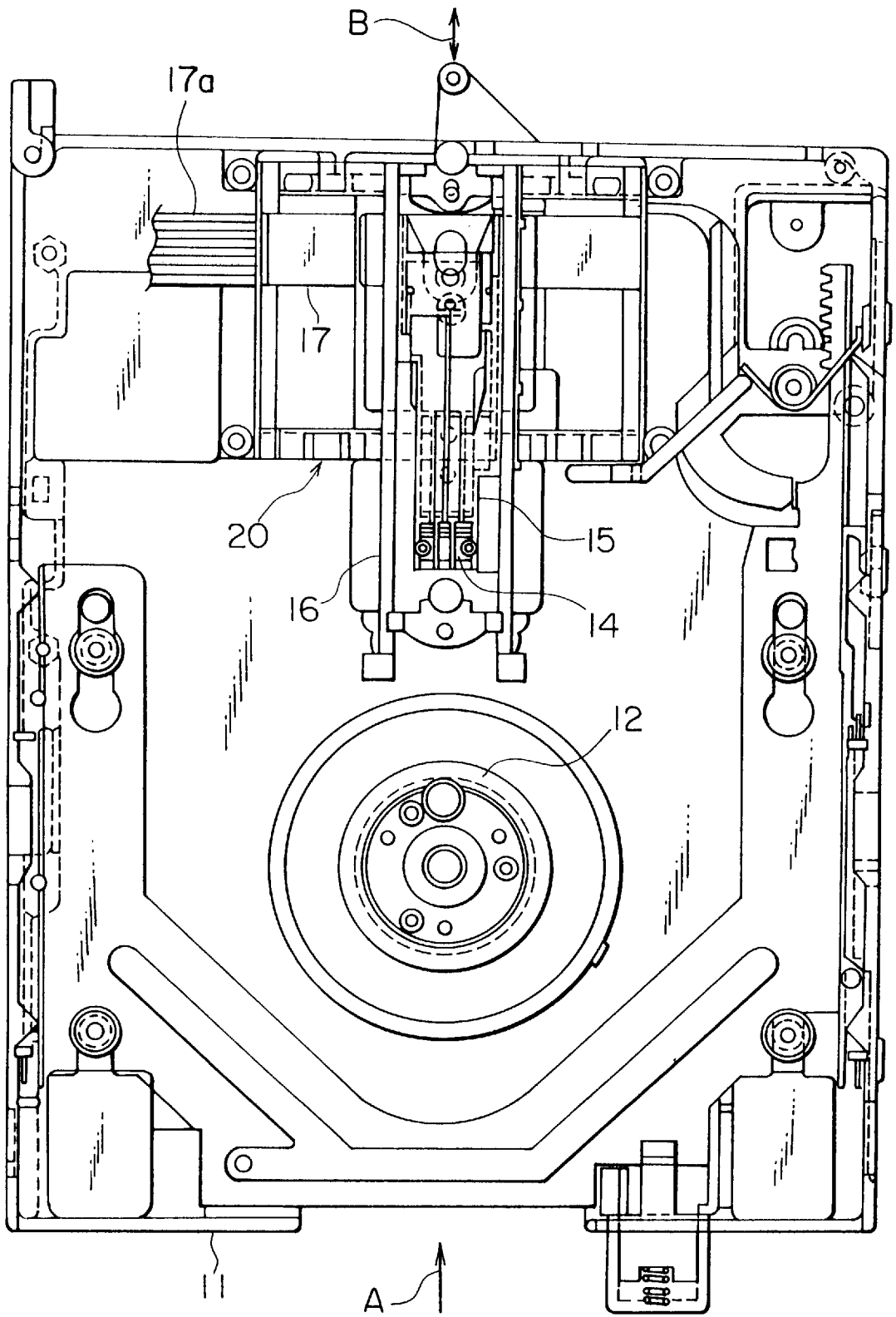
FIG. 1A is a plan view showing a flexible disk drive according to a preferred embodiment of the present invention.
Figure 1B:
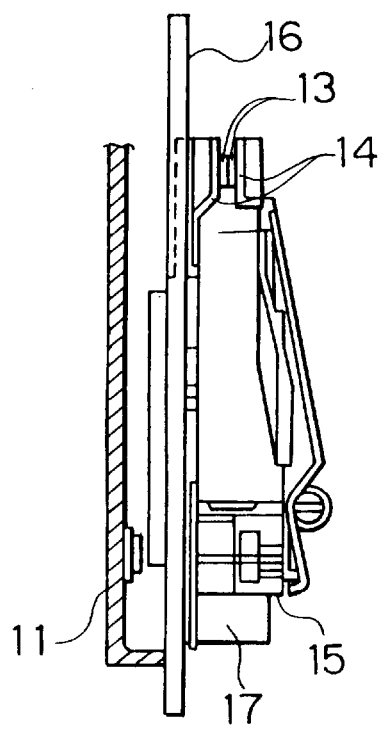
FIG. 1B is a side view showing a carriage assembly in the flexible disk drive.
Figure 2A:
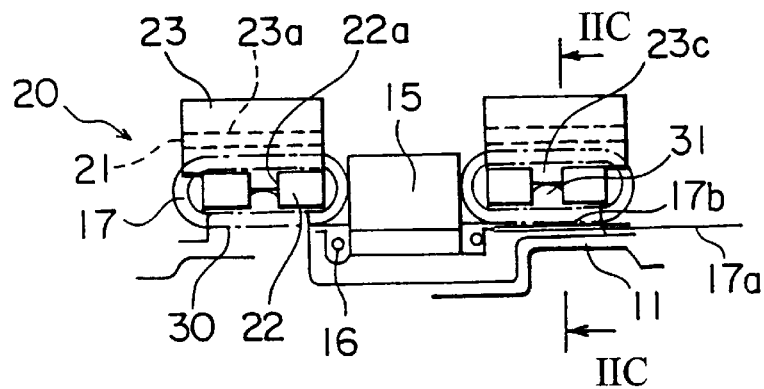
Figure 2B:
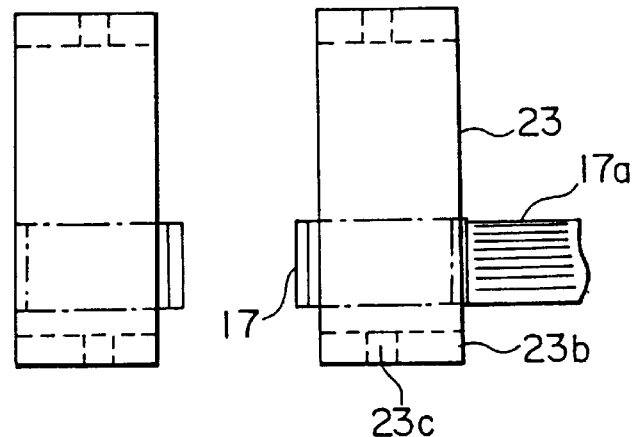
Figure 2C:
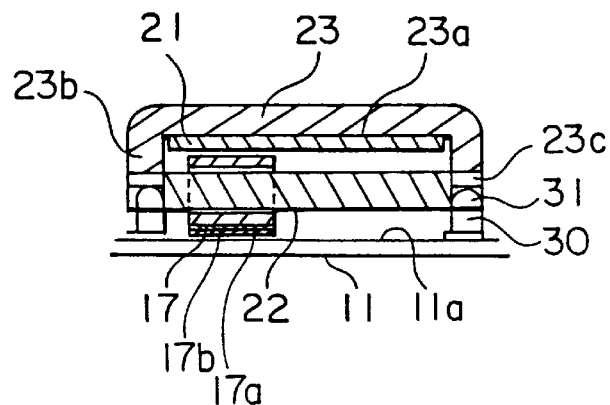

The flexible disk drive includes a magnetic head 13 for carrying out data reading and writing relative to the flexible disk. The magnetic head is held by a carriage 15 via a gimbal 14. For recording/reproducing for opposite sides of a magnetic recording medium of the flexible disk, a pair of magnetic heads 13 and a pair of gimbals 14 therefor are shown in FIG. 1B. The magnetic medium is disposed within a gap between the opposite magnetic head, as known in the prior art. A unit comprising the magnetic head 13, the gimbal 14 and the carriage 15 is called a carriage assembly. The carriage 15 is arranged over and spaced from the surface of the main frame 11 and holds the magnetic head to be movable in a predetermined radial direction, as shown by arrows B in FIG. 1A, with respect to the flexible disk.

On both sides, the carriage 15 is supported and guided at its lower ends by a pair of guide bars 16 extending in parallel to the predetermined radial direction B.

The carriage 15 is driven in the predetermined radial direction B by a voice coil motor. The voice coil motor includes a pair of voice coils 17 disposed rearward of the carriage 15 and each wound around a drive shaft extending in parallel to the foregoing predetermined radial direction B, and a pair of magnetic circuits 20 each for producing a magnetic field intersecting the electric current flowing through the corresponding voice coil 17. A flexible printed cable or circuit 17a is disposed adjacent one of the voice coils 17 and extends outside of the device. The flexible printed circuit 17a comprises first conductive patterns connected to the voice coil 17 as a drive unit for feeding a drive current to the voice coils 17, and second conductive patterns connected to the magnetic head 13, through which second conductive patterns a write data signal is given to the magnetic head 13 from the exterior for writing into the flexible disk while a read-out data signal read out from the flexible disk by the magnetic head 13 is sent out to the exterior.

As described above, since the flexible printed circuit 17a is arranged adjacent to the voice coil 17, the data signals (write and read-out signals) flowing through the flexible printed circuit 17a may be subjected to noise due to the electric current flowing through the voice coil 17. For preventing this, a magnetic shield 17b is interposed between the flexible printed circuit 17a and the voice coil 17. This can prevent noise from influencing data signals flowing through the flexible printed circuit 17a.

The magnetic shield 17b is made of, for example, copper, iron, aluminum or permalloy. Other materials may also be used for the magnetic shield 17b as long as they can achieve the required magnetic shielding.

Figure 3:
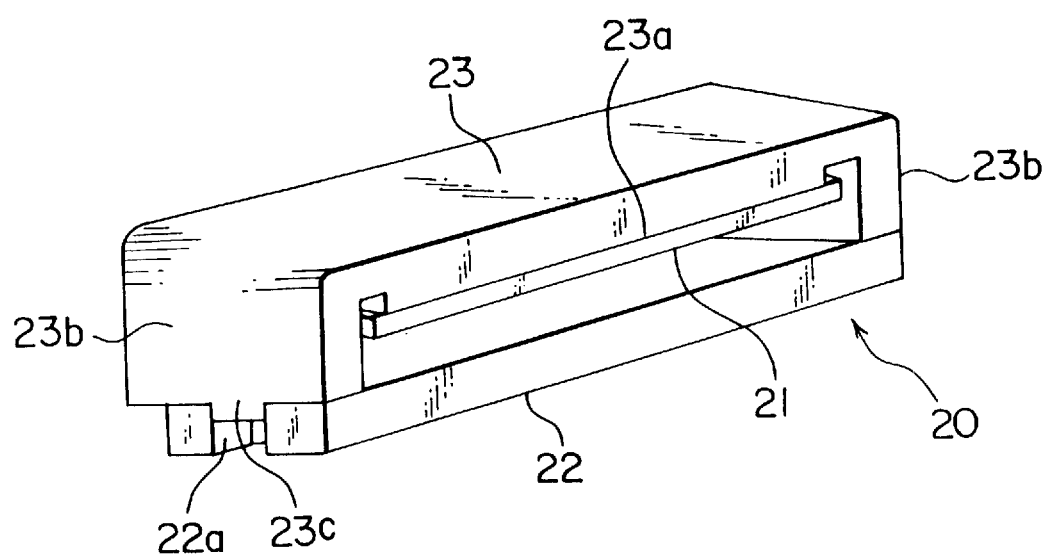
FIG. 3 is a perspective view showing a magnetic circuit of the voice coil motor shown in FIGS. 2A–2C.

Referring also to FIG. 3, each of the magnetic circuits 20 includes a magnet 21 magnetized in its thickness direction and a yoke portion. The yoke portion includes a center yoke 22, that is, the drive shaft around which the voice coil 17 is wound, and a back yoke 23. The back yoke 23 has a main surface 23a spaced from and confronting the center yoke 22 in a parallel relationship thereto. Both end portions 23b of the back yoke 23 are bent in perpendicular relative to the main surface 23a by press working. The end portions 23b are in abutment with opposite end portions of the center yoke 22. The magnet 21 is in abutment with the main surface 23a of the back yoke 23. Each of the center yoke 22 and the back yoke 23 is made of a steel plate having a thickness no less than 1 mm.

The main frame 11 includes two pedestals 30 for arranging each of the magnetic circuits 20 so as to space them from a main surface 11a of the main frame 11. Each of the four pedestals 30 has an upward protruding portion 31. A height of the protruding portion 31 is set smaller than a thickness of the center yoke 22. The center yoke 22 has a pair of cut-out portions 22a at opposite ends thereof for receiving therein the protruding portions 31 of the corresponding pedestals 30. Hence, the protruding portions 31 work as positioning means for positioning the corresponding center yoke 22. Further, each of the end portions 23b of the back yoke 23 has a convex portion 23c which is fitted in the corresponding cut-out portion 22a of the center yoke 22. A height of each convex portion 23c is set approximately to a value derived by subtracting the height of the protruding portion 31 of the pedestal 30 from the thickness of the center yoke 22. Accordingly, the cut-out portions 22a of the center yoke 22 work as positioning means for positioning the back yoke 23.

In the voice coil motor thus structured, the magnetic field is generated in the space between the center yoke 22 and the back yoke 23 of each of the magnetic circuits 20. When the electric current is caused to flow through each of the voice coils 17 in a direction intersecting the magnetic field produced by the magnetic circuit 20, a drive force is generated in an extending direction of the drive shaft (center yoke 22) based on interaction between the electric current and the magnetic field. The generated drive forces cause the carriage 15 to move in the foregoing predetermined radial direction B.

As described above, in the foregoing preferred embodiment, since the magnetic shield 17b is disposed between the flexible printed circuit 17a and the voice coil 17, the data signal flowing through the flexible printed circuit 17a can be sheilded from the influence of noise, thereby avoiding the generation of error in performing write and read-out data operations.

While the present invention has been described in terms of the preferred embodiment, the invention is not to be limited thereto, but can be embodied in various ways without departing from the principle of the invention as defined in the appended claims. For example, the present invention is applicable not only to the flexible disk drive, but also to other magnetic recording/reproducing devices where a drive unit for a carriage includes a coil to be applied with the drive current and a circuit for data writing and data reading is arranged near the coil.

What is claimed is:

1. A magnetic recording/reproducing device comprising:
   a main frame;
   a disk table rotatably mounted on said main frame for receiving and driving a recording medium thereon;
   a magnetic head for recording data onto and/or reproducing data from said recording medium;
   a magnetic head carriage spaced from said main frame and supporting said magnetic head;

a voice coil motor mounted on said main frame for driving said magnetic head carriage in a predetermined radial direction with respect to said magnetic recording medium on said disk table, said voice coil motor comprising a voice coil, a drive shaft mounted on said main frame and extending in parallel to said predetermined radial direction, and a magnetic yoke for generating a magnetic field intersecting a drive current flowing through said voice coil;

a flexible printed cable disposed adjacent to said voice coil and extending outside of said magnetic recording/reproducing device, said flexible printed cable comprising first conductive patterns connected to said voice coil for feeding said drive current to said voice coil and second conductive patterns connected to said magnetic head for transmitting a write signal to said magnetic head and a read-out signal from said magnetic head; and a magnetic shield element disposed in a gap between said voice coil and said flexible printed cable.

2. A magnetic recording/reproducing device according to claim 1, wherein said magnetic shield element comprises a material selected from the group consisting of copper, iron, aluminum and permalloy.

3. A magnetic recording reproducing device according to claim 1, wherein said voice coil motor includes a pair of voice coils disposed rearward of the carriage.

4. A magnetic recording/reproducing device according to claim 1, wherein the magnetic yoke comprises a steel plate having a thickness of at least 1 mm.

* * * * *